US00RE39773E

(19) United States
(12) Reissued Patent
Surya et al.

(10) Patent Number: US RE39,773 E
(45) Date of Reissued Patent: Aug. 14, 2007

(54) TONER CARTRIDGE IDENTIFICATION SYSTEM FOR A PRINTER

(75) Inventors: Ronald V. Surya, Laguna Hills, CA (US); Gregory S. Kussman, Mesa, AZ (US); Cheston Sung Yin Chan, Rowland Heights, CA (US)

(73) Assignee: Troy Group, Inc., Santa Ana, CA (US)

(21) Appl. No.: 10/829,478

(22) Filed: Apr. 21, 2004

Related U.S. Patent Documents

Reissue of:
(64) Patent No.: 6,477,335
Issued: Nov. 5, 2002
Appl. No.: 09/853,269
Filed: May 11, 2001

(51) Int. Cl.
*G03G 15/00* (2006.01)
*G03G 15/08* (2006.01)
*H01H 51/00* (2006.01)
*H01H 9/00* (2006.01)

(52) U.S. Cl. ..... 399/12; 335/153; 335/207; 399/25

(58) Field of Classification Search ..... 335/151, 335/152, 153, 207; 399/12, 24, 25, 27, 28, 399/29, 30, 111, 119, 120
See application file for complete search history.

(56) References Cited

U.S. PATENT DOCUMENTS 3,599,132 A * 8/1971 Shlesinger ..... 335/153
4,912,512 A * 3/1990 Midorikawa et al. ..... 399/12

FOREIGN PATENT DOCUMENTS

JP 61-156165 * 7/1986
JP 63-85771 * 4/1988

* cited by examiner

*Primary Examiner*—Hoang Ngo

(57) ABSTRACT

An apparatus for communicating to a printer a type of installed printer cartridge, where the combination of the cartridge and the printer form a magnetic coupling that can generate a cartridge specific code to identify the toner cartridge as being of a predetermined type. In a preferred embodiment, the magnetic coupling is achieved using at least two reed switches preferably mounted on the printer, with the reed switches biased using fixed magnetic elements placed immediately adjacent the reed switches. In the absence of any further magnetic fields, the reed switches are selected to provide a known set of switch positions corresponding to a bit value of one ("1") for an open circuit and a bit value of zero ("0") for a closed circuit. Magnetic elements on a printer cartridge are positioned to be disposed adjacent the reed switches and opposite the fixed magnets, and of a size and field strength sufficient to counteract the fixed magnetic elements adjacent the reed switches when the cartridge is inserted into the printer. The positions of the reed switches on the printer may be transformed into a sequence of bits of "1"s and "0"s. This series of data (ones and zeros) can be used to distinguish one printer cartridge from another and allow automatic optimization of the printer settings based on the cartridge recognition.

20 Claims, 2 Drawing Sheets

TONER CARTRIDGE IDENTIFICATION SYSTEM FOR A PRINTER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to toner cartridge consuming products such as printers, and more particularly to an apparatus and method for identifying a printer's toner cartridge using a series of magnetic couplings to generate a cartridge specific identification code.

2. Description of Related Art

The use of toner in paper processing machines to transfer text or images onto stock paper is now commonplace. In many cases toner is delivered via a cartridge specifically designed for the particular machine. Toner cartridges are used in copying machines, stand alone printers, facsimile machines, and a wide assortment of machines designed to process stock or blank paper into paper with print, images, text, or graphics. The methodology behind the particular printing technology is not necessary for an understanding of the present invention and will be omitted for simplicity.

The manufacture of toner using equipment are concerned about the use of the equipment after its initial sale because the manufacture is typically obligated to repair the equipment under warranty agreements. If the equipment can be used improperly, it is often the manufacture who bears the burden of increased costs associated with the misuse of the equipment. One of the main issues that confront these manufacturers is the use of toner cartridges that are not specifically designed for the particular application. The use of some toner cartridges will damage the equipment and cause undo wear and other difficulties.

The problem persists because most varieties of toner cartridge use an interchangeable cartridge design. Many printers include settings optimized for a specific toner cartridge brand or type based on specifications, testing, or experience of the cartridge's manufacture. The use of interchangeable cartridges leads to the printer's misinterpretation of the contents of the cartridge, with corresponding misapplied settings specifically adapted for a special cartridge's characteristics. The result is a poor quality print product and potential damage to the printer. This results in significant costs to the party responsible for maintenance, which must continually repair the toner consuming machines due to the use of non-approved toner, and must answer to questions of poor printer quality.

SUMMARY OF THE INVENTION

The present invention is a method and apparatus for identifying a type of printer cartridge to the printer, where magnetic elements on the cartridge and the printer combine to form a magnetic coupling that generates a cartridge specific code to identify the toner cartridge as being of a predetermined type. In a preferred embodiment, the magnetic coupling is achieved using one or more reed switches preferably mounted on the printer (although the switches could be mounted on the cartridge with similar results), with the reed switches biased using fixed magnetic elements placed immediately adjacent the reed switches. In the absence of any further magnetic fields, the reed switches are selected to provide a known set of switch positions corresponding to a bit value of one ("1") for an open circuit and a bit value of zero ("0") for a closed circuit. Magnetic elements on a printer cartridge are positioned to be disposed adjacent the reed switches and opposite the fixed magnets, and of a size and field strength sufficient to counteract the fixed magnetic elements adjacent the reed switches when the cartridge is inserted into the printer. By detecting the status of the reed switches on the printer as "open" or "closed," a sequence of bits of "1"s and "0"s can be achieved. This data can be used to distinguish one print cartridge from another and allow automatic optimization of the printer settings based on the cartridge recognition.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been define herein specifically to provide a method and apparatus for identifying a printer cartridge by a printer using a non-volatile magnetic code.

In the present invention, the printer must be able to recognize a particular toner cartridge by reading a sequence of magnetic field detecting switches. The preferred embodiment for accomplishing this object is to use a plurality of reed switches such as the one shown in FIG. 1.

A reed switch 10 is a device that is often times used as a proximity sensor to detect the presence of a magnet. A reed switch is usually a mechanical contacting switch, where the mechanical contact is typically enclosed in a tube structure 12. Internal to the reed switch are two ferromagnetic contacts, a normally open contact ("NO") 14 and a normally closed contact ("NC") 16. The normally open contact 14 is grounded, while the normally closed lead 16 is connected to an external power source supplying the appropriate voltage required by the equipment.

Figure 2:
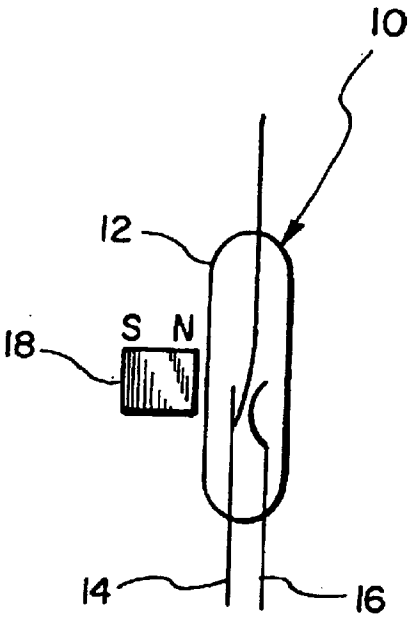
FIG. 2 is a schematic diagram of a reed switch in the presence of an applied magnetic field to produce a normally open ("NO") position.
Figure 1:
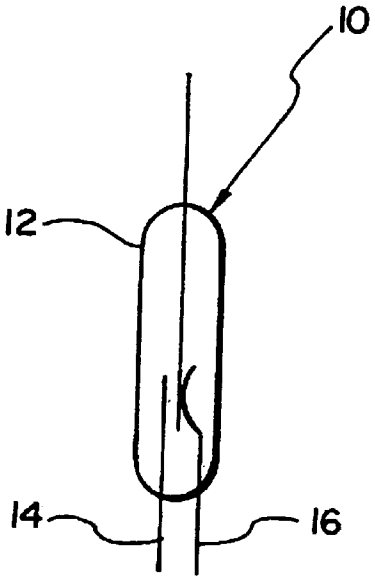
FIG. 1 is a schematic diagram of a reed switch in a normally closed ("NC") position.

The reed switch as shown in FIG. 1 occupies a normally closed position in the absence of an external magnetic field. FIGS. 2 illustrates the situation where a magnetic element 18 is brought in proximity with the reed switch 10. In this case, the switch position will switch from the normally closed position to the normally open position as the reed is magnetically attracted to the externally applied magnetic field. The present invention preferably applies an initial magnetic field to the reed switches using a small magnetic element 18 fixed immediately adjacent the reed switch on the printer. This small magnetic element 18 biases the reed switch in a predetermined position. The predetermined position is dependent upon the initial position of the reed switch in the absence of the magnetic field as well as the polarity of the small fixed magnetic element.

Figure 3:
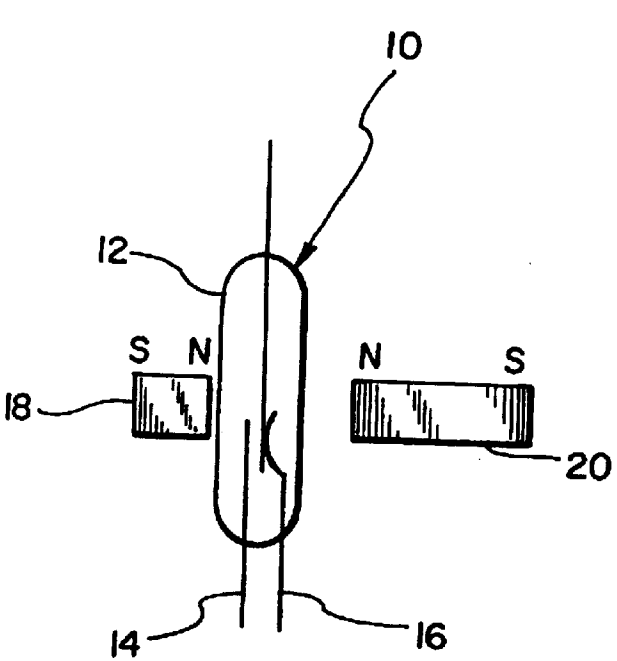
FIG. 3 is a schematic diagram of a reed switch in the presence of equally opposed magnetic fields, returning the switch to its normally closed position.

If a larger opposing magnetic element 20 is brought in proximity with the biased reed switch 10 (see FIG. 3), the two magnetic elements 18,20 if selected properly and spaced in relation to their respective magnetic fields can counteract each other and return the switch to its unbiased position. That is, the larger magnetic element can return the magnetic switch back to the default position the switch would assume if no external magnetic fields are present.

Figure 4:
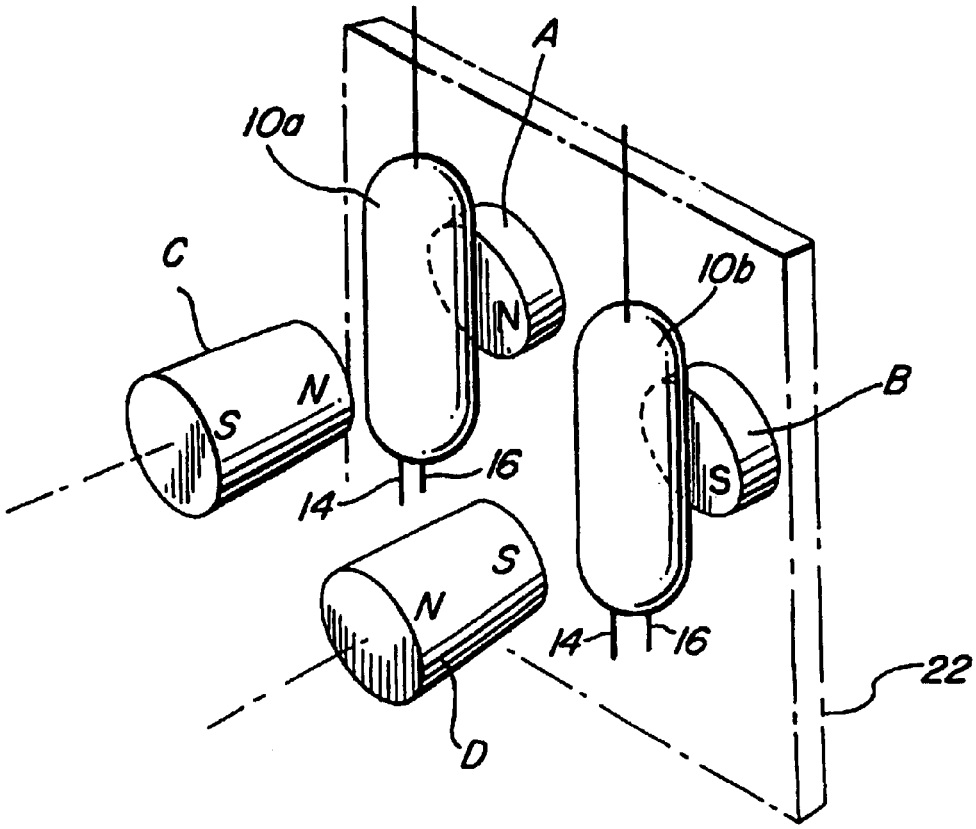
FIG. 4 is an elevated perspective view of a preferred embodiment of a cartridge and printer magnetic elements of the present invention.

In a preferred system of FIG. 4, the printer represented by plane 22 includes a pair of reed switches 10a, 10b adjacent to the location where the cartridge (not shown) resides. Prior to the introduction of magnetic elements C and D, one of the reed switches preferably occupies a normally closed ("NC") position and the other reed switch occupies a normally open ("NO") lead. The respective positions can be easily achieved by including a pair of fixed magnets immediately adjacent the reed switches, one magnet having a "north" polarity exerting a magnetic field on its corresponding reed switch and a second magnet having a "south" polarity exerting a magnetic field on its corresponding reed switch. In this configuration, if a cartridge is inserted into the printer with no magnetic elements to counterbalance the existing fixed magnets, the reed switches will not deviate from their normal, biased position. This condition indicates to the printer that a non-recognized cartridge has been inserted into the printer.

In a preferred system of FIG. 4, the printer represented by plane 22 includes a pair of reed switches 10a, 10b adjacent to the location where the cartridge (not shown) resides. Prior to the introduction of magnetic elements C and D, one of the reed switches preferably occupies a normally closed ("NC") position and the other reed switch occupies a normally open ("NO") lead. The respective position can be easily achieved by including a pair of fixed magnets, A and B, immediately adjacent the reed switches, one magnet having a "north" polarity exerting a magnetic field on its corresponding reed switch. In this configuration, if a cartridge is inserted into the printer with no magnetic elements to counterbalance the existing fixed magnets (A and B), the reed switches will not deviate from their normal, biased positions. This condition indicates to the printer that a non-recognized cartridge has been inserted into the printer.

However, if the cartridge includes a pair of magnets as shown in FIG. 4 having opposed polarities to those of the fixed magnetic elements and of a size to compensate for the increased distance between the fixed magnetic elements and the magnets on the printer cartridge, both reed switches will default to their unbiased positions, indicating to the printer a successful cartridge recognition. In this case, the printer can reset the print setting to optimize the settings for the recognized printer cartridge. By increasing the "bits," i.e., switch/magnet combinations, a code can be developed for a plurality of cartridge types, such as cartridge families and specific models within a particular cartridge family.

Figure 5:
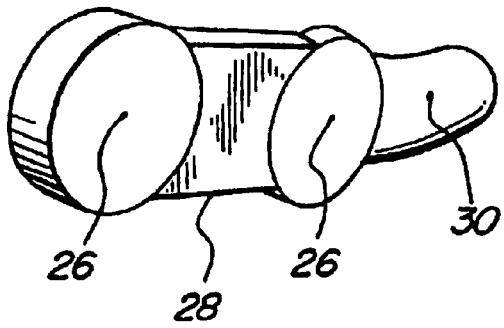
FIG. 5 is a perspective view of a pair of magnetic elements for use with a cartridge of the present invention.

The printer cartridge can be equipped readily with a complimentary magnetic couple to the fixed magnets, as shown in FIG. 5. The embodiment shown in FIG. 5 includes two magnets 26 separated by a non-magnetic spacer 28. An adhesive flap 30 is indicated to mount the complimentary circuit component to the printer cartridge adjacent the reed switches 10 of the printer 22. Further, the size of the magnets 26 and the distance effected by the spacer 28 are selected to introduce the desired magnetic field in order to trigger the reed switches 10 on the printer. The size of the magnets 26 are a function of the distance between the magnets on the complimentary circuit component of the cartridge and the reed switches when the cartridge is installed. Separating the magnets 26 by a short distance will increase the field strength about the magnets as compared to having the magnets 26 in contact with each other, but too great a separation isolates the strength of the individual magnets negating the combined effect. By knowing the distance that the complementary magnetic circuit lies from the reed switches when the cartridge is inserted into the printer allows for a determination of the proper magnet size and strength.

Additionally, if a specified cartridge is identified as being of a non-authorized type (or conversely not identified as an authorized type), the printer can determine how many copies are made with the non-authorized cartridge for warranty and repair purposes. If a non-recognized cartridge is detected by the system, the printer may reset to default settings that are not optimized, but are more readily operational to a variety of cartridge types. Every copy made with a non-recognized cartridge can be counted and stored for later use in diagnostic evaluations.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A printer cartridge comprising a series of magnetic elements selected to counterbalance a series of magnetic elements on a printer, and each positioned to lie adjacent to a corresponding magnetic field detecting switch on the printer, where the position of the magnetic elements on the cartridge are located so as to change a condition of the corresponding magnetic field detecting switch when the cartridge is inserted into the printer.

2. The printer cartridge of claim 1 wherein the magnetic field detecting switch comprises a reed switch.

3. The printer cartridge of claim 1 wherein each magnetic field detecting switch comprises an element of a cartridge identification code.

4. A printer cartridge identification system comprising:

a printer cartridge having a plurality of magnetic elements disposed oppositely a plurality of magnetic field detecting switches located on a printer; and, a printer having the plurality of magnetic field detecting switches corresponding to the plurality of magnetic elements on the printer cartridge and a plurality of fixed magnetic elements adjacent the plurality of magnetic field detecting switches, each fixed magnetic element biasing one of the magnetic field detecting switches to a first position; and, where the magnetic field detecting switches cooperate to define a printer cartridge identification code.

5. The printer cartridge identification system of claim 4 wherein the magnetic elements on the printer cartridge are of a size and strength to counterbalance the fixed magnetic elements on the printer when the cartridge is located in the printer.

6. A printer cartridge identifying printer comprising:

a magnetic field detecting switch adjacent a printer cartridge port and adapted to switch from a first position to a second position when a magnet on the printer cartridge is brought in proximity with the magnetic field detecting switch;

circuitry on the printer for evaluating the position of the magnetic field detecting switch and determining whether the cartridge in the printer is of a specific type; and, a fixed magnetic element adjacent the magnetic field detecting switch to bias the magnetic field detecting switch to a predetermined position.

7. A printer cartridge identification system comprising:

a printer comprising a plurality of magnetic field detecting switches adjacent to a plurality of fixed magnetic elements on the printer; each fixed magnetic element having a magnetic field of a predetermined polarity and each magnetic field detecting switch having a first biased position and a neutral position; and, a printer cartridge having a plurality of magnetic elements; each magnetic element having a magnetic field of identical polarity to a corresponding fixed magnetic element on the printer, whereby the magnetic field of the magnetic element on the printer cartridge interacts with the magnetic field of its corresponding fixed magnetic element on the printer to allow return of the adjacent magnetic field detecting switch to the neutral position from the first biased position.

8. The printer cartridge identification system of claim 7 where a combination of magnetic field detecting switches define a printer cartridge identification code.

9. The printer cartridge identification system of claim 8 where the printer further comprises circuitry for evaluating the printer cartridge identification code by reading the position of each magnetic field detecting switch.

10. The printer cartridge identification system of claim 7 where the magnetic field detecting switches comprise reed switches.

*11. A device comprising:*

*a printer cartridge assembly; and*

*a first magnet coupled to the printer cartridge assembly, the first magnet selected to counterbalance a second magnet on a printer, the first and second magnets positioned to lie adjacent to a magnetic field detecting switch on the printer, wherein the position of the first magnet on the cartridge is located so as to change a condition of the magnetic field sensed by the magnetic field detecting switch when the cartridge is inserted into the printer.*

*12. The device of claim 11 wherein the magnetic field detecting switch comprises a reed switch.*

*13. The device of claim 11 wherein the magnetic field detecting switch is an element of a cartridge identification code.*

*14. A printer cartridge identification system comprising:*

*a printer cartridge including a first magnet; and*

*a printer including a first magnetic field detecting switch and a second magnet adjacent the first magnetic field detecting switch, the second magnet biasing the magnetic field detecting switch to a first position, wherein the first magnet changes the magnetic field sensed by that magnetic field detecting switch.*

*15. The printer cartridge identification system of claim 14 wherein the first magnet on the printer cartridge is of a size and strength to counterbalance the second magnet on the printer when the cartridge is located in the printer.*

*16. A printer cartridge identification system comprising:*

*a printer including a first magnetic field detecting switch,*

*a first magnet adjacent the first magnetic field detecting switch on the printer, the first magnet having a magnetic field of a predetermined polarity and the magnetic field detecting switch having a first biased position and a neutral position; and*

*a printer cartridge having a second magnet, the second magnet having a magnetic field of identical polarity to the first magnet on the printer, whereby the magnetic field of the second magnet interacts with the magnetic field of the first magnet on the printer to allow return of the magnetic field detecting switch to the neutral position from the first biased position.*

*17. The printer cartridge identification system of claim 16 where the position of the magnetic field detecting switch contributes to define a printer cartridge identification code.*

*18. A printer cartridge comprising:*

*a printer cartridge housing; and*

*a first magnet attached to the printer cartridge housing, the first magnet positioned to lie adjacent to a magnetic field detecting switch and a second magnet on a printer, when the printer cartridge is inserted into the printer, wherein the position of the first magnet on the cartridge is located so as to change a condition of the magnetic field detected by the magnetic field detecting switch when the cartridge is inserted into the printer.*

*19. The printer cartridge of claim 18 wherein the magnetic field of the first magnet causes the magnetic field detecting switch to change from a first position to a second position when the printer cartridge is inserted into the printer.*

*20. The printer cartridge of claim 18 wherein the position of the magnetic field detecting switch contributes to define a printer cartridge identification code.*

* * * * *